July 22, 1947.  C. P. WEST  2,424,345
SWITCHGEAR
Filed May 30, 1944  3 Sheets-Sheet 1
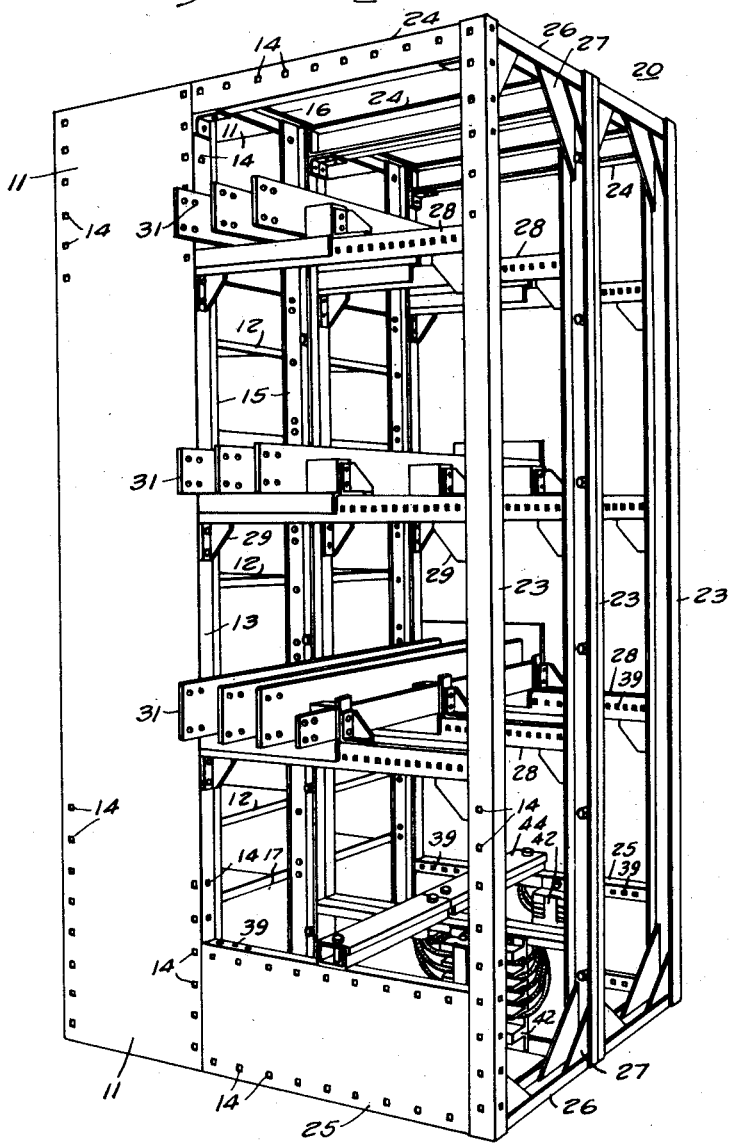
WITNESSES:
INVENTOR
Charles P. West.
BY
ATTORNEY July 22, 1947.   C. P. WEST   2,424,345
SWITCHGEAR
Filed May 30, 1944   3 Sheets-Sheet 2
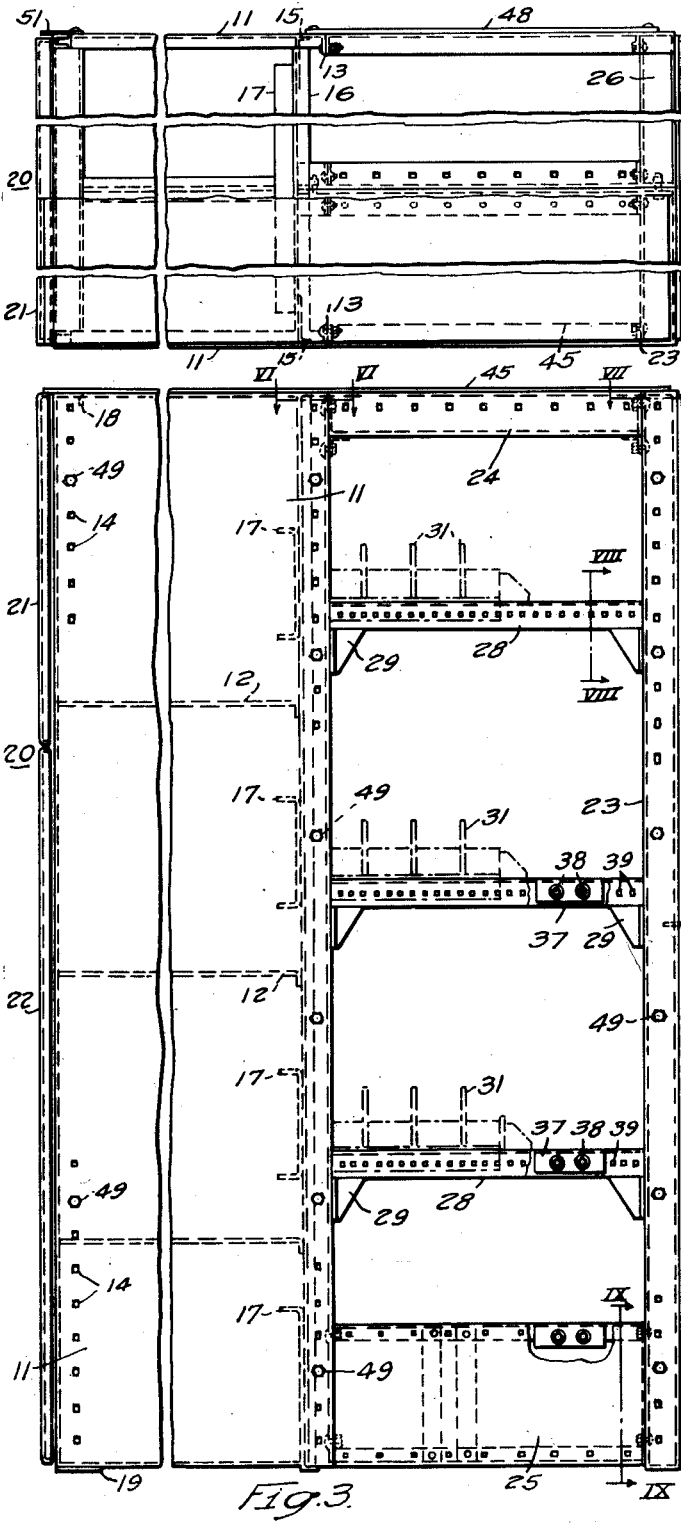
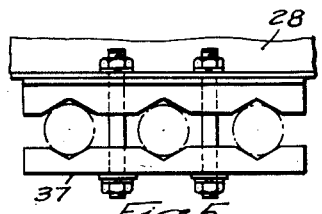
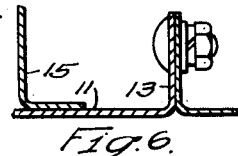
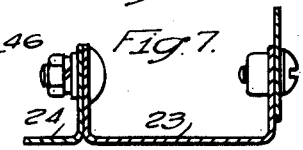
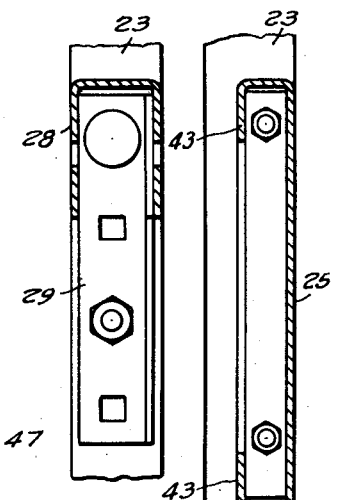
INVENTOR
Charles P. West.

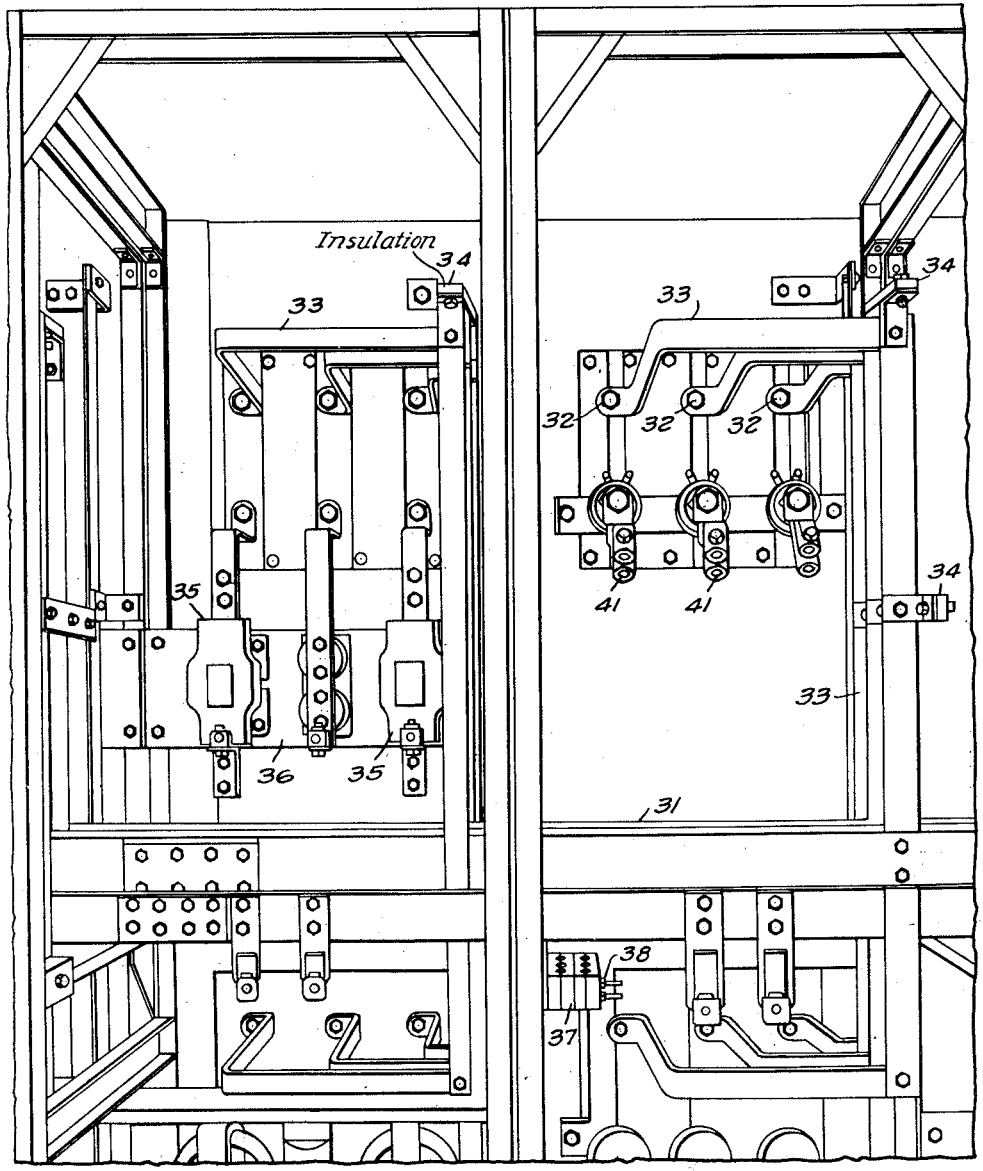

Patented July 22, 1947

2,424,345

UNITED STATES PATENT OFFICE 2,424,345

SWITCHGEAR

Charles P. West, Pittsburgh, Pa., assignor to Westinghouse Electric Corporation, East Pittsburgh, Pa., a corporation of Pennsylvania Application May 30, 1944, Serial No. 538,076

10 Claims. (Cl. 175—298)

My invention relates, generally, to switchgear and, more particularly, to switchgear units of the metal-enclosed type suitable for relatively low voltage service.

A low-voltage metal-enclosed switchgear unit is usually built up from a plurality of sections, preferably of equal height, each section comprising a framework, as of angle-iron construction, and having a plurality of compartments in the front for individual circuit breaker units, each compartment having a door or removable panel carrying the breaker controlling mechanism and other switchboard apparatus. The electrical connections at the rear of each section are usually enclosed in a compartment separated from the circuit-breaker compartments and accessible by removal of rear cover plates. A predetermined number of such sections may be assembled side-by-side to afford a unit capable of housing a desired number of circuit breakers. This assembly of sections forms a switchgear unit or metal-enclosed switchboard.

Heretofore, each section has been constructed by welding together the angle or channel members to make an integral frame which is subdivided into the desired number of front and rear compartments. Since the circuit breakers vary in size, thereby requiring compartments of different dimensions, and the space required for housing the bus bars, instrument transformers and associated apparatus varies for different installations, it has been necessary to make complete engineering drawings for each order received by a switchgear manufacturer before the parts can be formed and assembled in the factory. The preparation of the drawings involves a large amount of time and expense, thereby increasing the cost of the equipment and the time required to complete its manufacture. Furthermore, considerable material is wasted as scrap during the fabrication of the metal parts.

The object of my invention, generally stated, is to provide switchgear equipment which shall be simple and efficient in operation and which may be economically manufactured and installed.

An object of my invention is to provide metal-enclosed switchboards having universal frames made from standard parts which may be carried in stock by a switchboard manufacturer.

Another object of my invention is to reduce the drafting time and expense involved in the manufacture of metal-enclosed switchgear.

A further object of my invention is to provide a line of standard parts which may be utilized to assemble metal-enclosed switchboards of a variety of sizes.

A more specific object of my invention is to provide switchgear equipment of the metal-enclosed type having a unitary pre-fabricated front compartment and a rear compartment constructed of a plurality of pre-fabricated standard parts assembled to the front compartment.

Other objects of my invention will be explained fully hereinafter or will be apparent to those skilled in the art.

In accordance with my invention, each section of a metal-enclosed switchgear unit comprises a front compartment and a rear compartment constructed from parts which may be carried in stock and are so formed that they may be readily assembled. The front compartment may be divided into subcompartments for housing individual apparatus units and assembled separately from the rear compartment, the parts of which are joined onto the front compartment. The overall dimensions of a section are determined by selecting the proper parts, certain ones of which are the same for all sizes of sections and others of which vary according to the overall dimensions of the section. A number of sections may be fastened together to provide a unit of the desired size.

For a fuller understanding of the nature and objects of my invention, reference may be had to the following detailed description, taken in conjunction with the accompanying drawings, in which:

Figure 1 is a view, in perspective, of a switchgear unit embodying my invention;

Fig. 2 is a top plan view of a switchgear unit similar to the one shown in Fig. 1;

Fig. 3 is a view, in end elevation, of the structure shown in Fig. 2;

Fig. 4 is a view, in perspective, of a portion of a slight modification of the structure shown in Fig. 1;

Fig. 5 is an enlarged view, in plan, of a cable support utilized in the structure shown in Fig. 3; and Figs. 6, 7, 8 and 9 are enlarged views, in section, taken along the lines VI—VI, VII—VII, VIII—VIII and IX—IX, respectively, of Fig. 3.

Referring now to the drawings, and particularly to Figs. 1, 2 and 3, there is illustrated therein a portion of a switchgear unit 10 having two sections, each section of which includes a front compartment and a rear compartment. Each front compartment comprises a pair of vertical side plates 11 disposed in spaced relation with horizontal barriers 12 disposed between the side plates 11 to provide a plurality of sub-compartments at the front of each section for housing circuit breakers or other apparatus (not shown). Each side plate 11 is provided with an inturned edge 13 at the rear having a plurality of equally spaced openings 14, preferably square, provided therein. Additional openings 14 are also provided in the side of each plate 11 in spaced relation, as shown.

An angle member 15 is secured on the inside of each side plate 11. As shown most clearly in Figs. 2 and 6, the angle members 15 are spaced a short distance from the inturned edges 13 and they extend the full length of the side plates.

Each pair of side plates may be tied together at the rear by an angle member 16 disposed at the top of the structure and channel members 17 disposed at spaced intervals along the vertical angle members 15 and secured thereto. The members 17 also function as barriers to separate the breaker compartments from the bus compartment.

Each pair of side plates may be tied together at the front by a channel member 18 at the top and a flat bar 19 at the bottom of the structure. Hinged panels 21 and 22 of the usual type may be provided for the front of each section. As explained hereinbefore, the front compartment is self-supporting and may be completely assembled separately from the rear compartment.

A rear or bus compartment may be formed at the rear of the front or breaker compartments by vertically placing a rectangular frame 20 a predetermined distance from the rear edges of the side plates 11. The frame 20 comprises vertically disposed channel members 23 which may be tied to the side plates 11 by horizontally disposed channel members 24 and 25 located at the top and the bottom, respectively, of the structure. The horizontal members 24 and 25 may be bolted to the inturned edges 13 of the side plates 11 and to the vertical members 23.

The channel members 23, 24 and 25 are provided with a plurality of square openings 14, spaced similarly to those in the side plates 11. The vertical members 23 of the frame 20 may be tied together by horizontally disposed channel members 26, located at the top and the bottom of the structure. The framework may be strengthened by providing corner braces 27, as shown.

Channel members 28 may be horizontally disposed between the vertical members 23 and the side plates 11. The members 28 may be adjustably secured to the channel members 23 and the inturned edges 13 of the side plates 11 by brackets 29, which may be bolted in position at any desired height by utilizing the openings 14. Bus bars 31 may be adjustably mounted on the channel members 28 in the manner described in my copending application, Serial No. 538,077, filed May 30, 1944. Thus, the bus bars 31 may be adjusted both vertically and horizontally to any desired position in the bus compartment.

As shown in Fig. 4, the bus bars 31 may be connected to circuit breaker terminals 32 by means of copper straps 33 which may be supported by insulating supports 34 attached to the inturned edges 13 of the side plates 11. Current transformers 35 may be mounted on suitable supporting members 36 also attached to the inturned edges 13. Cable supports 37 may be attached to the horizontal channel members 28 by means of bolts 38 inserted in openings 39 for supporting cables which may be connected to circuit breaker terminals 41 when the switchgear is installed in service.

As shown in Fig. 1, terminal blocks 42 may be mounted on the channel members 25, which are provided with iturned edges 43, see Fig. 9, having a plurality of openings 39 therein spaced similarly to the openings in the bus-bar supports 28. A cross-panel wiring trough or gutter 44 may be mounted on top of the channel members 25.

As shown most clearly in Figs. 2 and 3, the structure may be enclosed by cover plates 45, 46, 47 and 48 which may be removably attached to the frame members. As shown, two sections may be stood side-by-side and bolted together by tie bolts 49 to form a switchgear unit. It will be understood that as many sections as desired may be utilized in a unit. The openings 14 which would otherwise be exposed in the end section of a unit may be covered by a narrow plate 51. As indicated in Fig. 1, additional bus bars may be connected to the bus bars 31 when additional sections are added to the two sections herein illustrated.

It will be seen that the size of an assembled section may be determined by the dimensions of certain of its component parts. As explained hereinbefore, all sections are uniform in height, therefore, all vertical members are of the same length. However, the depth of a section may be varied by utilizing side plates 11 of a different width or horizontal members 24, 25 and 28 of a different length, or both, depending on the relative sizes of breaker and bus compartments desired.

Likewise, the width of a section may be varied by utilizing tie members 16, 17, 18, 19 and 26 of a different length. Thus, these parts may be stocked in predetermined sizes and so designated on key drawings that they may be assembled without requiring the preparation of complete assembly drawings for each order received by a switchgear manufacturer. As explained previously, the provision of the openings 14 and 39 in the various parts permits the bus bars and electrical appurtenances to be mounted in any desired position within the bus compartment.

From the foregoing description, it is apparent that I have provided a switchboard structure which can be readily assembled in units of different dimensions from parts carried in stock. This method of construction affords a maximum of materials conservation in addition to permitting the equipment to meet the requirements of a particular job. Changes can easily be made in the field to increase the current capacity of an assembly and new units can be added to an installation by merely bolting in new members.

Since numerous changes may be made in the apparatus and the invention may be changed and modified without departing from the spirit and scope thereof, it is intended that all matter contained in the foregoing description or shown in the accompanying drawings shall be interpreted as illustrative and not in a limiting sense.

I claim as my invention:

1. A switchboard structure comprising, a plurality of switch compartments disposed between a pair of vertical side plates and a bus compartment at the rear of the switch compartments, said bus compartment being formed by a pair of vertical frame members spaced from each other and from the rear of the side plates, horizontal frame members for connecting the vertical frame members to the side plates, additional horizontal frame members for connecting the vertical frame members together, horizontally disposed bus supports adjustably attached to the vertical frame members and the side plates, supports for vertically disposed power conductors secured to said bus supports, and cover plates removably attached to said frame members.

2. A switchboard structure comprising, a plurality of switch compartments disposed between a pair of vertical side plates and a bus compartment at the rear of the switch compartments, said bus compartment being formed by a pair of vertical frame members spaced from each other and from the rear of the side plates, horizontal frame members for connecting the vertical frame members to the side plates, additional horizontal frame members for connecting the vertical frame members together, horizontally disposed bus supports extending between the vertical frame members and the side plates, said bus supports being adjustable vertically in said bus compartment, supports for vertically disposed power conductors secured to said bus supports, and cover plates attached to said frame members.

3. A switchboard structure comprising, a plurality of switch compartments disposed between a pair of vertical side plates and a bus compartment at the rear of the switch compartments, said bus compartment being formed by a pair of vertical frame members spaced from each other and from the rear of the side plates, horizontal frame members for connecting the vertical frame members to the side plates, additional horizontal frame members for connecting the vertical frame members together, horizontally disposed bus supports extending between the vertical frame members and the side plates, said bus supports being adjustable vertically along the frame members and the side plates, supports for vertically disposed power conductors secured to said bus supports, and cover plates attached to said frame members.

4. A switchboard structure comprising, a pair of vertical side plates disposed in spaced relation, each of the side plates having an inturned edge at the rear thereof, barriers disposed between the side plates to provide a plurality of compartments at the front of the switchboard, a pair of vertical frame members spaced from each other and from the rear of the side plates, horizontal frame members removably attached to the vertical frame members and the inturned edges on the side plates, wiring devices supported by said horizontal frame members, additional horizontal frame members removably attached to the vertical frame members, horizontally disposed bus-bar supports adjustably attached to the vertical frame members and the inturned edges of the side plates, and cover plates attached to the frame members.

5. A switchboard structure comprising, a pair of vertical side plates disposed in spaced relation, each of the side plates having an inturned edge at the rear thereof, barriers disposed between the side plates to provide a plurality of compartments at the front of the switchboard, a pair of vertical frame members spaced from each other and from the rear of the side plates, horizontal frame members removably attached to the vertical frame members and the inturned edges on the side plates, wiring devices supplanted by said horizontal frame members, additional horizontal frame members removably attached to the vertical frame members, horizontally disposed bus-bar supports extending between the vertical frame members and the inturned edges of the side plates, said bus supports being adjustable vertically along the frame members and the side plates, and cover plates attached to the frame members.

6. A switchboard structure comprising, a pair of vertical side plates disposed in spaced relation, each of the side plates having an inturned edge at the rear thereof, barriers disposed between the side plates to provide a plurality of compartments at the front of the switchboard, a pair of vertical frame members spaced from each other and from the rear of the side plates, horizontal frame members removably attached to the vertical frame members and the inturned edges on the side plates, wiring devices supported by said horizontal frame members, additional horizontal frame members removably attached to the vertical frame members, horizontally disposed bus-bar supports extending between the vertical frame members and the inturned edges of the side plates, said inturned edges and said vertical frame members having a plurality of openings therein for vertical adjustment of said bus-bar supports.

7. A switchboard structure comprising, a pair of vertical side plates disposed in spaced relation, each of the side plates having an inturned edge at the rear thereof, barriers disposed between the side plates to provide a plurality of compartments at the front of the switchboard, a pair of vertical frame members spaced from each other and from the rear of the side plates, horizontal frame members removably attached to the vertical frame members and the inturned edges on the side plates, wiring devices supported by said horizontal frame members, additional horizontal frame members removably attached to the vertical frame members, horizontally disposed bus-bar supports extending between the vertical frame members and the inturned edges of the side plates, said bus-bar supports having a plurality of openings therein for changing the location and the number of the bus-bars supported thereby.

8. A switchboard structure comprising, a self-supporting front compartment and a rear compartment removably attached to the front compartment, said rear compartment being formed by a rectangular frame vertically disposed a predetermined distance from the rear of the front compartment, horizontally disposed members for tieing said frame to the front compartment, additional horizontally disposed members vertically adjustable in said rear compartment, cover plates removably attached to said frame, wiring devices supported by the horizontally disposed tie members, and bus bars adjustably mounted on said additional horizontal members.

9. A switchboard structure comprising, a self-supporting front compartment and a rear compartment removably attached to the front compartment, said rear compartment being formed by a rectangular frame vertically disposed a predetermined distance from the rear of the front compartment, horizontally disposed members for tieing said frame to the front compartment, additional horizontally disposed channel members vertically adjustable in said rear compartment, cover plates removably attached to said frame, and vertically disposed power conductors secured to the sides of said channel members.

10. A switchboard structure comprising, a self-supporting front compartment and a rear compartment removably attached to the front compartment, said rear compartment being formed by a rectangular frame vertically disposed a predetermined distance from the rear of the front compartment, horizontally disposed members for tieing said frame to the front compartment, additional horizontally disposed channel members vertically adjustable in said rear compartment, and channel members having spaced openings in the sides thereof, bus bars adjustably mounted on said additional horizontal members by means of said openings, said bus bars being adjustable both vertically and horizontally in said rear compartment, and vertically disposed power conductors secured to said channel members by means of said openings.

CHARLES P. WEST.

REFERENCES CITED

The following references are of record in the file of this patent:

UNITED STATES PATENTS

| Number | Name | Date |
|---|---|---|
| 2,319,415 | Lightfoot | May 18, 1943 |
| 1,493,431 | Fries et al. | May 6, 1924 |
| 1,955,287 | Graves et al. | Apr. 17, 1934 |
| 1,951,457 | Warner | Mar. 20, 1934 |
| 1,732,346 | Waller | Oct. 22, 1929 |
| 1,487,856 | Hauserman | Mar. 25, 1924 |
| 1,700,549 | Spratt | Jan. 29, 1929 |
| 1,492,309 | Ogden | Apr. 29, 1924 |